United States Patent [19]

Meyer

[11] 4,329,538
[45] May 11, 1982

[54] CONDUCTOR BAR OF AN ELECTRIC MACHINE

[75] Inventor: Hartmut Meyer, Berlin, Fed. Rep. of Germany

[73] Assignee: Siemens Aktiengesellschaft, Munich, Fed. Rep. of Germany

[21] Appl. No.: 135,119

[22] Filed: Mar. 28, 1980

Related U.S. Application Data

[63] Continuation of Ser. No. 937,437, Aug. 28, 1978, abandoned.

[30] Foreign Application Priority Data

Sep. 6, 1977 [DE] Fed. Rep. of Germany ....... 2740544

[51] Int. Cl.$^3$ .............................................. H01B 7/02
[52] U.S. Cl. ......................... 174/119 R; 174/117 FF; 174/120 R; 336/206
[58] Field of Search ......... 174/119 R, 117 FF, 120 R; 336/223, 206; 310/201

[56] References Cited

U.S. PATENT DOCUMENTS

| 905,554 | 12/1908 | Mitchell | 174/119 R |
| 3,263,196 | 7/1966 | Reber | 336/206 X |
| 3,723,797 | 3/1973 | Andersson | 174/117 FF X |
| 3,860,744 | 1/1975 | Schuler | 174/119 R X |
| 3,868,613 | 2/1975 | Rogers | 336/206 |

FOREIGN PATENT DOCUMENTS

| 397892 | 5/1909 | France | 174/117 FF |
| 1156133 | 6/1969 | United Kingdom | 174/117 FF |

Primary Examiner—Richard R. Kucia
Attorney, Agent, or Firm—Kenyon & Kenyon

[57] ABSTRACT

A conductor bar for an electric machine is disclosed. At least one strip-like insert is provided on a surface of the conductor which forms an angle with an insulating sleeve enclosing the insert and conductor. Voids are produced at the edges of the insert which form impregnating canals for an impregnating medium to thereby improve the impregnability of the insulating sleeve.

9 Claims, 2 Drawing Figures

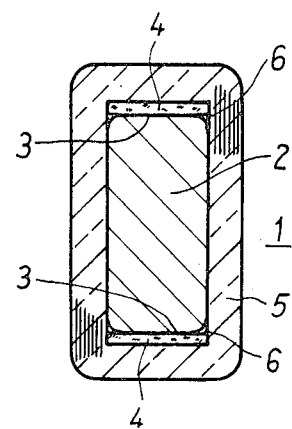
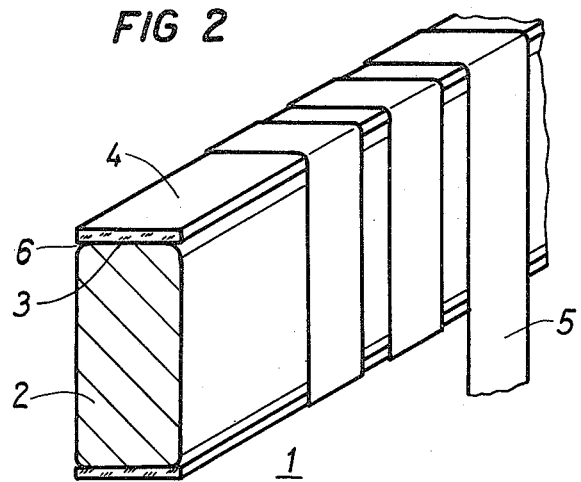

CONDUCTOR BAR OF AN ELECTRIC MACHINE

This is a continuation of application Ser. No. 937,437 filed Aug. 28, 1978 now abandoned.

BACKGROUND OF THE INVENTION

The present invention relates to a conductor bar of an electric machine, and more particularly to a conductor bar which is surrounded by an insulating sleeve and which is impregnated with a hardenable impregnating medium.

Conductor bars for electric machines, as for example a squirrel cage motor, conventionally comprise a solid, usually rectangular, conductor surrounded by an insulating sleeve wound from a tape, for example a mica-containing tape. The so-wound bar is impregnated with a hardenable impregnating medium which is thereafter hardened. Such solid conductors have a smooth outer surface which the wound insulating sleeve closely follows. This arrangement can present difficulty with respect to the thorough impregnation of the insulating sleeve with insulating resins or varnishes since the insulating layers formed by the tape present a high flow resistance to the impregnating media perpendicularly to the surface of the layers. The penetration of the impregnating medium into the layered insulation takes place preferably parallel to the surface of the layers between them and in the space between the conductor surface and the insulating sleeve, i.e. in the lenghwise direction of the conductor. However, in conventional arrangements, imperfect impregnation of the insulating sleeve may result which degrades the operating behavior of the hardened insulation substantially.

SUMMARY OF THE INVENTION

It is an object of the present invention to provide a conductor bar for electric machines having a solid conductor surrounded by an insulating sleeve in which the impregnation of the conductor bar is improved.

This and other objects are achieved by providing, according to the invention, at least one strip-like insert on a surface of the conductor, which forms an angle with an insulating sleeve which encloses the conductor and insert. In accordance with the invention, voids are produced at the edges of the insert which form additional impregnating canals for the impregnating medium and thereby improve the impregnatability of the insulating sleeve. Preferably, the insert is aligned in the longitudinal direction of the conductor, so that the impregnating canals are as narrow as possible and extend over the entire length of the conductor.

In accordance with the preferred embodiment, the conductor is of generally rectangular configuration and an insert is disposed adjacent each of the opposed narrower surfaces of the conductor. Wedge-shaped spaces are thereby produced which form impregnating canals. A tape is wound about the inserts and conductor to form the insulating sleeve.

The impregnation can be further improved according to the invention by providing inserts having cavities or a surface structure which includes voids or grooves.

The inserts may be formed of solid, conductive or nonconductive material, particularly from wire, glass and synthetic fiber fabric or mats. Such inserts may advantageously be formed with a surface structure in which the fibers forming the fabrics or mats have a different thickness. For example, the fabric or mat may have thin weft threads and thicker warp threads. When the thicker fibers are disposed to lie entirely or predominantly in the longitudinal direction of the solid conductor on the suface thereof, additional impregnating canals are thereby formed by the spacing between the tape and the conductor surface.

These and other aspects of the invention will be more apparent from the following description of the preferred embodiment thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is a cross-sectional view of a conductor bar according to the invention in which inserts are disposed on two opposed surfaces of a conductor, and FIG. 2 is a perspective view of the conductor bar according to the invention in which the conductor having the inserts disposed thereon as in FIG. 1 is being wound with an insulating tape.

DESCRIPTION OF THE PREFERRED EMBODIMENT

Referring more particularly to the drawings, the conductor bar 1 of an electric machine according to the preferred embodiment of the invention is shown which comprises a generally rectangular conductor 2 of solid copper. On the narrow sides 3 of the conductor 1, strip-like inserts 4 are arranged which extend in the longitudinal direction of the conductor 2. Around the conductor 2 and the inserts 4 is wound an insulating sleeve 5, from, for example, a mica-containing tape. Wrapping of the tape causes the inside of the insulating sleeve 5 to closely follow the cross-section of the conductor 2 and the inserts 4. As shown, the generally rectangular conductor has rounded edges and the strip-like inserts extend over the conductor edges to form wedge-shaped spaces 6 along the edges of the inserts 4 between the inserts and the conductors. The spaces 6 form impregnating canals which extend in the longitudinal direction of the conductor bar 1. The impregnating canals promote the complete impregnation of the insulating sleeve 5 with a hardenable impregnating material such as epoxy resin, so the insulation for the bar is produced without voids after hardening of the resin takes place.

The inserts 4 may be made of glass fabric having thin weft and thicker warp threads which produce additional spaces between the bar and the inserts thereby forming additional impregnating canals in the vicinity of the inserts 4 in addition to the impregnating canals formed by the wedge-shaped spaces 6. Preferably, the thicker threads extend in the longitudinal direction of the conductor.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from the spirit and scope of the invention.

What is claimed is:

1. A conductor bar of an electric machine comprising a single solid conductor of generally rectangular cross-section having four longitudinally-extending side-portions, at least one longitudinally-extending strip-shaped insert disposed adjacent the surface of at least one of the side portions of said conductor, an insulating sleeve wound directly over said strip and the three exposed longitudinally-extending side portions of said conductor to surround said conductor and said strip, said strip extending on said surface at an angle to the winding of said insulating sleeve and being disposed to form canals at the edges of the insert between the insert and the conductor which extend along the conductor at the inside of the insulating sleeve, and a hardenable impregnating material applied to the conductor, the strip and the insulating sleeve which enters and substantially fills the canals.

2. The conductor as recited in claim 1, wherein the conductor has generally rounded edges, and said insert extends past said edges to form said canals between the edges of said insert and the edges of said surface of said conductor.

3. The conductor bar according to claims 1 or 2, and comprising two inserts disposed on opposed surfaces of said conductor.

4. The conductor bar according to claims 1 or 2, wherein the insulating sleeve is formed from a mica-containing tape wound about the at least one insert and conductor.

5. The conductor bar according to claims 1 or 2, wherein the conductor has unequal adjacent side portions and at least one insert is disposed on at least one of the narrower surfaces of the generally rectangular conductor.

6. The conductor bar according to claims 1 or 2, wherein the insert includes cavities therein.

7. The conductor bar according to claim 6, wherein the cavities are formed by a surface structure of the strip.

8. The conductor bar according to claim 7, wherein the insert comprises a fabric or mat material.

9. The conductor bar according to claim 8, wherein the fabric or mat material includes fibers of different thicknesses.

* * * * *